J. F. DREES.
DISK SHARPENER.
APPLICATION FILED AUG. 7, 1915.
1,193,130.
Patented Aug. 1, 1916.
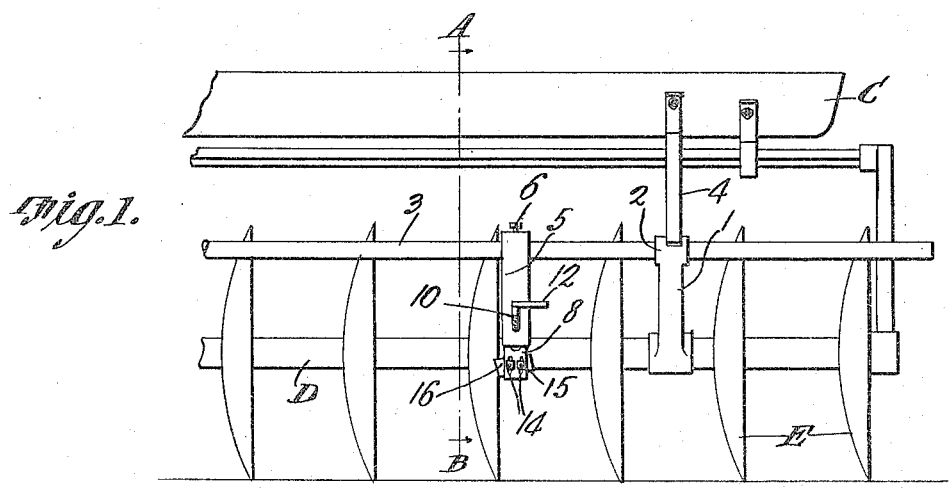
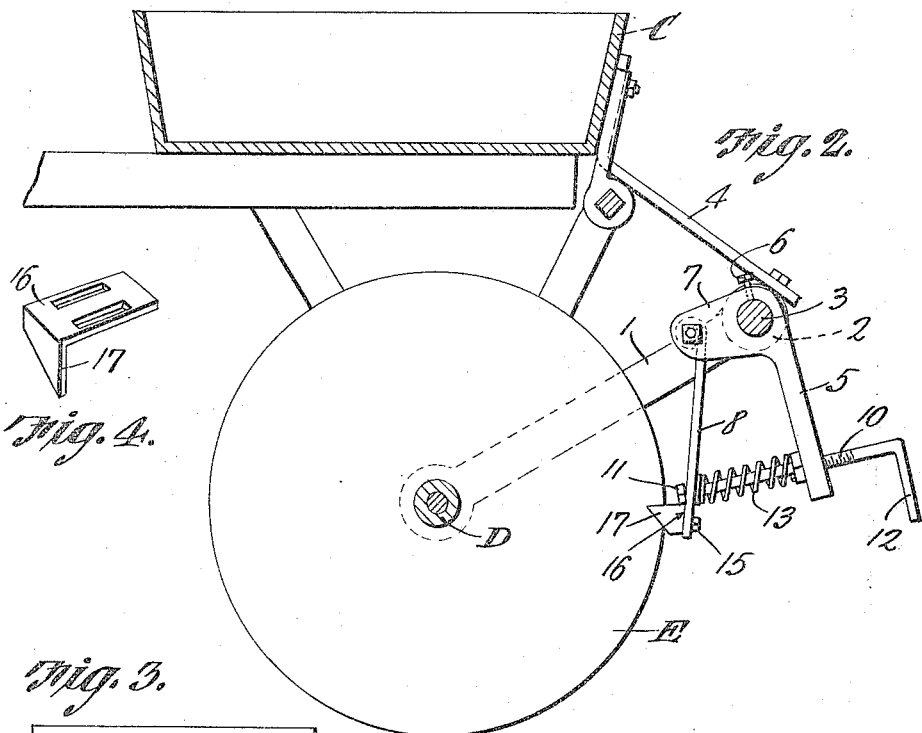
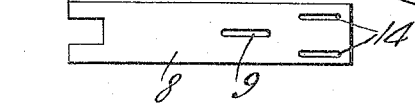
Witnesses
J. F. Drees — Inventor
Attorneys

UNITED STATES PATENT OFFICE.

JOHN F. DREES, OF NEW VIENNA, IOWA.

DISK-SHARPENER.

1,193,130.  Specification of Letters Patent.  Patented Aug. 1, 1916.

Application filed August 7, 1915. Serial No. 44,211.

*To all whom it may concern:*

Be it known that I, JOHN F. DREES, a citizen of the United States, residing at New Vienna, in the county of Dubuque and State of Iowa, have invented a new and useful Disk-Sharpener, of which the following is a specification.

This invention relates to a disk sharpener for use in connection with disk cultivators and harrows, one of the objects of the invention being to provide a sharpener which can be readily attached to a harrow or cultivator and which, while in position, operates to sharpen the disk while in use.

Another object is to provide a sharpening attachment which can be applied readily to a disk harrow or cultivator already in use and which is adjustable so as to bear with any desired pressure upon the disk to be sharpened.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—Figure 1 is a rear elevation of a portion of a disk harrow or cultivator having the present improvements combined therewith. Fig. 2 is an enlarged section on line A—B Fig. 1. Fig. 3 is a plan view of the plate used for supporting the sharpener. Fig. 4 is a detail view of the sharpening blade.

Referring to the figures by characters of reference C designates a weight box below which is arranged a shaft D carrying the disks E. Mounted on the shaft D are arms 1 inclined upwardly and rearwardly, these arms being detachably fastened to the shaft in any desired manner. The upper ends of the arms are provided with sleeves 2 through which extends a rod 3 and this rod 3 is connected to the weight box C by means of arms 4 through which the rod 3 extends.

Adjustably mounted on rod 3 is an arm 5, there being a set screw 6 or the like carried by the arm and which is adapted to bind on rod 3 so as to hold the arm against movement relative to the rod. This arm 5 has a finger 7 extending therefrom and pivotally connected to the free end portion of the arm is a plate 8 provided with a slot 9 for the reception of an adjusting bolt 10. This bolt has a nut 11 thereon and also has a threaded portion which engages the finger 7 extending from arm 5. The bolt 10 can be rotated in any suitable manner, as by means of a handle 12 at one end thereof and mounted on the bolt and between the plate 8 and finger 7 is a coiled spring 13 which exerts a constant downward pressure upon plate 8. Nut 11 bears on the plate.

Formed in the plate 8 adjacent its free end are parallel slots 14. These slots receive clamping bolts 15 which engage a plate 16 extending transversely of the plate 8. Plate 16 is provided, at one end, with a blade 17 the lower or active edge of which is inclined as shown. It is to be understood that in using the structure herein described, the arm 5 is adjusted along rod 3 until the blade 17 is brought against the edge of the disk E to be sharpened. The said arm is then held against further movement by means of the set screw 6 and the bolt 10 is adjusted so as to raise or lower the plate 8 relative to finger 7, thus to position the active or sharpening edge of the blade 17 at the proper angle relative to the disk.

With the device herein described in position, it will be seen that as the machine is moved forward the disk engaged by the blade 17 will rub thereacross and be sharpened so that no time need be lost in sharpening the disk. After one disk has been sharpened, the parts may be adjusted to another position to sharpen a second disk and this operation can be continued until all of the disks have been sharpened.

It will be seen that the structure is very simple, and can be applied readily to machines already in use.

By providing a spring 13 as shown, the plate 8 and the sharpening blade 17 are permitted to yield upwardly should the blade become hung upon an obstruction or projection on the disk engaged thereby, thus preventing injury to the parts.

What is claimed is:—

The combination with a structure including a ground engaging disk, of a guide rod extending back of and transversely of the disk, an arm adjustable angularly upon and longitudinally of the rod, a finger extending from said arm and toward the disk, a plate hingedly connected to the finger and interposed between the disk and the arm, a disk engaging blade adjustably connected to the plate, yielding means interposed between the arm and plate for pressing the blade against the disk, and adjustable means for limiting the movement of the plate in one direction relative to the arm.

In testimony that I claim the foregoing as my own, I have hereto affixed my signature in the presence of two witnesses.

JOHN F. DREES.

Witnesses:
    JOHN DREES,
    JOSEPH SCHINDLER.